Patented June 12, 1923.

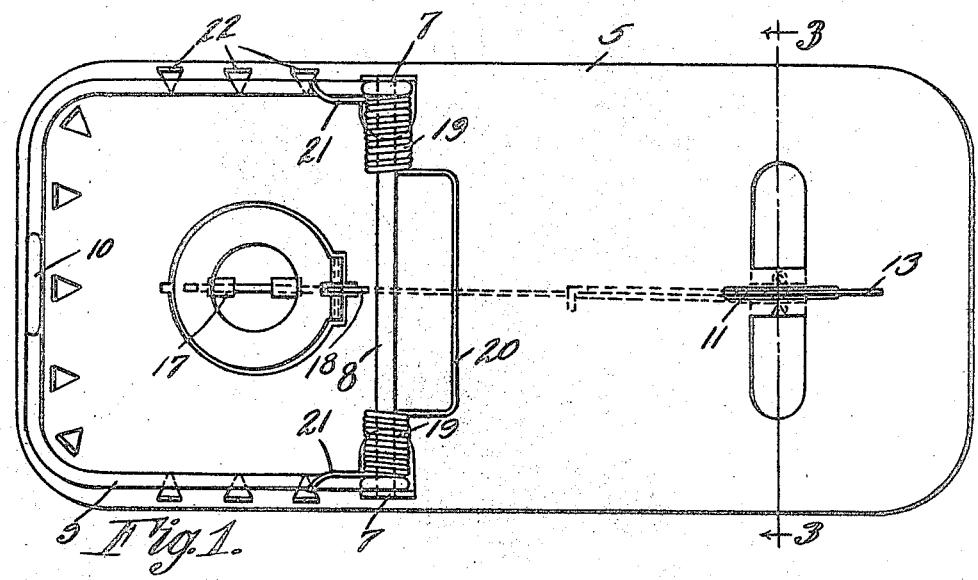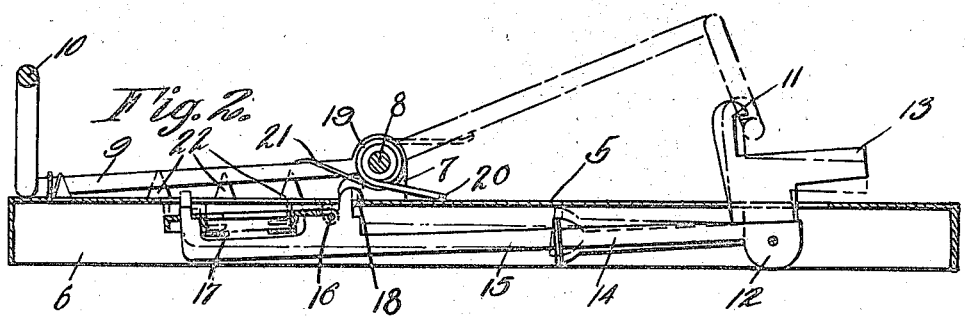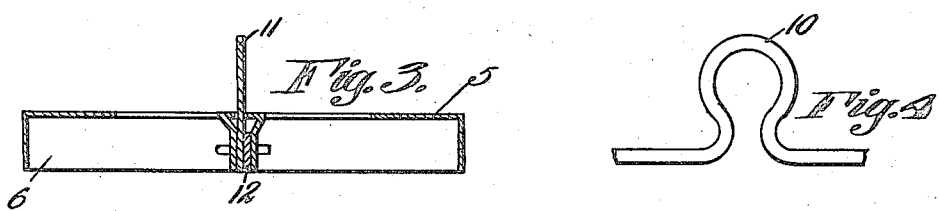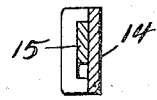

1,458,404

UNITED STATES PATENT OFFICE.

HENRY C. GOODMAN, OF LOS ANGELES, CALIFORNIA.

RAT TRAP.

Application filed December 19, 1921. Serial No. 523,409.

*To all whom it may concern:*

Be it known that I, HENRY C. GOODMAN, a citizen of the United States, residing at Los Angeles, in the county of Los Angeles and State of California, have invented a new and useful Rat Trap, of which the following is a specification.

This invention relates to traps, and more particularly to traps of the spring jaw type, the primary object of the invention being to provide a trap of a novel construction whereby the same may be set by the operator placing his hand at a point remote from the jaw of the trap, or the person setting the trap having his hands caught by the jaw.

Another object of the invention is to provide a pivoted bait retaining member, a hook member connected with the pivoted bait retaining member, the construction being such as to permit of movement of the hook member with respect to the bait retaining member.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a plan view of a trap constructed in accordance with the present invention.

Figure 2 is a longitudinal sectional view through the trap, the same being shown in dotted lines in a set position.

Figure 3 is a sectional view taken on line 3—3 of Figure 1.

Figure 4 is an enlarged detail view of one portion of the spring jaw.

Figure 5 is a sectional view through the members 14 and 15 illustrating the connection between the members.

Referring to the drawing in detail, the device embodies a trap or body portion 5 formed preferably of sheet metal and having its side and end edges bent downwardly to provide supporting flanges 6.

Stamped from the body portion 5 are the ears 7 that extend upwardly from the upper surface thereof and provide bearings for the shaft 8 that supports the spring jaw 9 formed of a length of metal preferably circular in cross section and having its ends formed into eyes to accommodate portions of the shaft 8.

This jaw 9 is provided with a loop portion 10 which extends upwardly when the trap is in an unset position but designed to engage under the hook member 11 when the trap is in a set position. Supported between the supporting flanges of the trap, is a pin 12 that provides a support for the hook member 11 that is shown as provided with a depending portion apertured to accommodate the rod 12.

The hook member 11 is stamped from sheet metal and embodies a forwardly extending portion 13 designed to be engaged by the thumb of the person setting the trap to move the hook member 11 to a position to engage the loop portion 10 of the spring jaw. An arm 14 is formed integral with the hook member and is provided with a right angled flange 14', slotted to accommodate the arm 15, the slot being of a length greater than the width of the arm 15 to permit of slight movement of the arm 14 with respect to the arm 15, to allow the hook member 11 to move to a setting position.

The arm 15 is also pivotally connected to the body of the trap as by means of the pin 12, and as shown, a circular bait retaining member 17 is pivotally supported at one end of the arm 15 by means of pin 16 and is designed to normally lie in the same plane with the upper surface of the body portion 5. The bait retaining member 17 is circular in formation and formed with a central opening 17'. Depending arms 18' are formed on the wall of the opening as shown by Figure 2 of the drawing, so that the bait which rests thereon, will normally be supported below the upper surface of the body 5. In order that the bait retaining member will be restricted in its movement, a hook member 18 is provided on the arm 15 and is adapted to engage the upper surface of the body portion 5, it being understood that the hook member 18 is passed through a suitable opening in the body portion.

Coiled springs indicated at 19 are connected by a relatively straight portion 20 adapted to engage the upper surface of the body portion, the ends of the coiled springs embodying arms 21 that overlie portions of the jaw 9 to normally urge the same to a position as illustrated by Figure 1 of the drawing.

Teeth 22 are punched from the surface of the body portion and extend upwardly in proximity to the jaw 9 when the same is in an unset position, the teeth 22 being designed to cooperate with the jaw 9 to grip an animal caught in the trap.

From the foregoing it will be seen that the jaw 9 may be moved to a set position, it being unnecessary to place the hands in a position under the jaw 9, the jaw 9 being moved by a person gripping the loop portion 10 of the jaw and moving the same to a position over the hook member 11, the thumb of the person setting the trap, being used to tilt the hook member to a position as shown in dotted lines by Figure 2 of the drawing.

It is obvious that when an animal endeavors to move the bait placed on the bait retainer, the arm 15 will move to disengage the hook member 11 permitting the same to move to a position in gripping relation with the teeth 22.

Having thus described the invention, what is claimed as new is:—

1. A trap comprising a body portion, said body portion having an opening disposed adjacent to one end thereof, a pivoted hook member having a forwardly extending portion, pivotally supported by the body, said hook member having an arm formed integral therewith and extending under the body portion, said arm having a slotted right angled flange formed at one end thereof, an arm pivotally supported under the body portion and extending through the slot of the flange, said last mentioned arm having a bait retaining member disposed in the opening of the body portion, and a spring controlled jaw adapted to be held in its inactive position by engagement with the hook member.

2. In a trap, a body portion, a pivoted hook member extending through the body portion and having a forwardly extending member, an arm formed integral with the hook member to move therewith, a bait retaining arm pivotally supported under the body portion, means for connecting the arms to permit movement of one arm with respect to the other arm, and second mentioned arm having means for supporting bait in a plane below the upper surface of the body portion.

In testimony that I claim the foregoing as my own, I have hereto affixed my signature in the presence of two witnesses.

HENRY C. GOODMAN.

Witnesses:
C. C. KEY,
LESLIE L. WHITE.